US011904230B2

(12) United States Patent
Park et al.

(10) Patent No.: US 11,904,230 B2
(45) Date of Patent: Feb. 20, 2024

(54) DEVICE FOR INPUTTING AND CONTROLLING DRIVING STATE INFORMATION OF BILLIARD BALL

(71) Applicant: GO CUE INC., Incheon (KR)

(72) Inventors: Chul Hoon Park, Incheon (KR); Ji Hoon Na, Seoul (KR)

(73) Assignee: GO CUE INC., Incheon (KR)

( * ) Notice: Subject to any disclaimer, the term of this patent is extended or adjusted under 35 U.S.C. 154(b) by 338 days.

(21) Appl. No.: 17/437,157

(22) PCT Filed: Nov. 27, 2019

(86) PCT No.: PCT/KR2019/016518
§ 371 (c)(1),
(2) Date: Sep. 8, 2021

(87) PCT Pub. No.: WO2020/184810
PCT Pub. Date: Sep. 17, 2020

(65) Prior Publication Data
US 2022/0168623 A1 Jun. 2, 2022

(30) Foreign Application Priority Data
Mar. 8, 2019 (KR) .......................... 10-2019-0026924

(51) Int. Cl.
*A63D 15/00* (2006.01)
*G06F 3/0338* (2013.01)

(52) U.S. Cl.
CPC ........... *A63D 15/00* (2013.01); *G06F 3/0338* (2013.01)

(58) Field of Classification Search
CPC .............................. A63D 15/00; G06F 3/0338
See application file for complete search history.

(56) References Cited

U.S. PATENT DOCUMENTS 4,253,090 A * 2/1981 Storie .................. A63F 7/2409
324/179
5,171,012 A * 12/1992 Dooley .............. G07F 17/3297
463/2
(Continued)

FOREIGN PATENT DOCUMENTS

CN 105396287 A 3/2016
CN 105413172 A 3/2016
(Continued)

OTHER PUBLICATIONS

US 2002/0018582 A1, 02/2002, Hagiwara et al. (withdrawn)
(Continued)

*Primary Examiner* — Malina D. Blaise
(74) *Attorney, Agent, or Firm* — ROTHWELL, FIGG, ERNST & MANBECK, P.C.

(57) ABSTRACT

The present invention relates to a device for inputting and controlling driving state information of a billiard ball for playing a billiard game in cyberspace and, more specifically, to a device for inputting and controlling driving state information of a billiard ball, in which an actual billiard ball is fixedly mounted on a standard table, wherein the billiard ball is mounted to be freely rotatable, and is hit by an actual billiard cue stick to receive the billiard ball's effecto information, rotation speed, and rotation direction, as well as driving state information for hitting strength and movement direction, and the received information is processed through driving state information processing software to display an image result reflecting the billiard ball's movement direction and movement amount on the actual billiard table, thereby making it possible to enjoy a billiard game in cyberspace as though a real game were being played.

12 Claims, 7 Drawing Sheets

(56) References Cited

U.S. PATENT DOCUMENTS

| | | | | |
|---|---|---|---|---|
| 5,734,370 | A * | 3/1998 | Skodlar | G06F 3/0362 345/157 |
| 6,217,450 | B1 * | 4/2001 | Meredith | A63D 15/08 463/2 |
| 6,312,335 | B1 * | 11/2001 | Tosaki | A63F 13/245 463/37 |
| 7,607,982 | B2 * | 10/2009 | Sugimori | A63F 7/0058 463/2 |
| 7,798,904 | B2 * | 9/2010 | Hamano | A63F 13/573 463/2 |
| 7,892,148 | B1 | 2/2011 | Stauffer et al. | |
| 10,715,759 | B2 * | 7/2020 | Dibenedetto | A63F 13/211 |
| 2003/0096649 | A1 * | 5/2003 | Hamano | A63F 13/245 463/36 |
| 2003/0130037 | A1 * | 7/2003 | Sugimori | A63F 13/812 463/37 |
| 2006/0100016 | A1 * | 5/2006 | Hamano | A63F 13/42 463/36 |
| 2011/0022202 | A1 * | 1/2011 | Lundback | A63D 15/20 700/91 |
| 2012/0235353 | A1 * | 9/2012 | Chambless, III | A63F 7/0628 273/108 |
| 2015/0001796 | A1 * | 1/2015 | Stellenberg | A63F 7/26 273/121 A |
| 2017/0001100 | A1 * | 1/2017 | Stellenberg | G07F 17/323 |
| 2017/0312570 | A1 * | 11/2017 | Loftsgard | A63B 71/0619 |
| 2017/0332946 | A1 * | 11/2017 | Kikkeri | A61B 5/1116 |
| 2018/0339223 | A1 * | 11/2018 | Haas | G06T 19/006 |
| 2019/0134506 | A1 * | 5/2019 | Gupta | G09B 19/0038 |
| 2020/0005587 | A1 * | 1/2020 | Hartl | G07F 17/3286 |
| 2021/0118267 | A1 * | 4/2021 | Gupta | G07F 17/3223 |
| 2022/0233942 | A1 * | 7/2022 | Ferrabee | G06T 7/75 |
| 2022/0383702 | A1 * | 12/2022 | Gupta | G07F 17/3267 |

FOREIGN PATENT DOCUMENTS

| | | |
|---|---|---|
| DE | 202011004098 U1 | 6/2011 |
| JP | 2001-178966 A | 7/2011 |
| KR | 10-0560030 B1 | 3/2006 |
| KR | 10-0624250 B1 | 9/2006 |
| KR | 10-1097054 B1 | 12/2011 |
| KR | 10-1928246 B1 | 12/2018 |
| KR | 10-1994829 B1 | 7/2019 |

OTHER PUBLICATIONS

Office Action dated Aug. 17, 2022, issued in the corresponding Indian Patent Application No. 202127044652, 6 pages.

Search Report dated Oct. 20, 2022, issued in the corresponding European Patent Application No. 19918764.2, 5 pages.

International Search Report issued for International Application No. PCT/KR2019/016518 dated Mar. 12, 2021, 4 pages.

* cited by examiner

DEVICE FOR INPUTTING AND CONTROLLING DRIVING STATE INFORMATION OF BILLIARD BALL

CROSS REFERENCE TO RELATED APPLICATION(S)

This application is a 35 U.S.C. 371 National Phase Entry Application from PCT/KR2019/016518, filed on Nov. 27, 2019 and designating the United States, which claims priority based on Korean Patent Application No. 10-2019-0026924 filed on Mar. 8, 2019, all of the disclosures of which are incorporated herein by reference in their entirety.

TECHNICAL FIELD

The present disclosure relates to a billiard ball driving state information input and control device for playing a billiard game in cyberspace and, more specifically, to a billiard ball driving state information input and control device, in which an actual billiard ball is fixedly mounted on an ordinary table, wherein the billiard ball is mounted to be freely spinnable, and is hit by an actual billiard cue stick such that the billiard ball driving state information input and control device receives driving state information about a billiard ball's hitting point information, spinning speed, and spinning direction, as well as hitting strength and movement direction, and the received information is further processed through driving state information processing software to display an image result reflecting in the same level of the billiard ball's movement direction and movement amount on an actual billiard table, thereby making it possible to enjoy a billiard game in cyberspace as if the game were being actually played.

BACKGROUND ART

In general, billiards is a kind of leisure sport in which each player competes for scores by hitting red and white billiard balls on a billiard table with a cue stick. There are several games of billiards, and billiards may be generally divided into a pocket game and a carom game depending on whether there is a pocket on the billiard table. Each game proceeds by chain reactions in each of which a cued billiard ball collides with other billiard balls. For example, a four-ball game is a game in which each player hits their own cue ball using a cue stick to cause the hit cue ball to collide with a first target ball and a second target ball while the cue ball moves while avoiding an opponent's cue ball.

In billiards, it is fundamentally important to accurately hit a hitting point of the cue ball with a cue stick, and to determine how thick the cue ball and the first target ball collide and in which direction the colliding cue ball moves.

In order to hit the hitting point accurately, it is important that the forward and rearward movement of the cue stick stably is performed on the same straight line during preparation (stroke) and hitting (shot) actions. However, it is difficult for most beginners or intermediate and lower-level players to hit the hitting point accurately because the cue stick shakes during the cue stick preparation actions and hitting actions.

In order to increase the hitting accuracy, much practice is required in a short time, but it is difficult to find a practice place other than a billiard hall, and it is difficult to sufficiently practice because the use of the billiard hall is also quite burdensome in terms of cost and travel time. This is a factor that easily lowers the interest in billiards since the skill improvement of beginners and intermediate and lower-level players progresses slowly.

Korean Patent No. 10-1097054 (registered on Dec. 15, 2011; hereinafter referred to as "Prior Art Document 1") suggests a billiard table for screen billiard games. Prior Document 1 discloses a configuration including a short billiard table on which a cue ball is placed, a screen unit which is located above the billiard table and on which a virtual image is projected by a projector, and a screen for displaying virtual billiards. When the user hits the cue ball with the cue stick, the cue ball collides with the screen unit and is retrieved. At this time, the screen unit detects the direction and speed of the cue ball and moves a virtual billiard ball on the screen to play the game. According to Prior Art Document 1, it is possible to maximize the realism because the actual cue ball moves after hitting, but information on the location of the hitting point cannot be measured, so it is not possible to accurately calculate and provide the movement amounts of respective billiard balls including the cue ball.

Japanese Patent Laid-open Publication No. 2001-178966 (published on Jul. 3, 2001) (hereinafter, referred to as "Prior Art Document 2") suggests a billiard video game system. In Prior Art Document 2, a mock ball of a billiard controller in the shape of a billiard ball is hit with a cue stick, and the mock ball measures the hitting point and hitting strength and arithmetically processes the measured information to calculate the movement directions and amounts of respective billiard balls so as to cause the billiard balls to be displayed at moved positions. In Prior Art Document 2, the billiard ball is configured to be separated into a fixed member and a moving member, and when the moving member is hit with the cue stick, the moving member is rotated by a certain angle in the fixed member, and a degree of rotation generates hitting point information using the amount of displacement of a stick unit in the fixed member. However, in Prior Art Document 2, since the moving member rotates within 90 degrees, the rotation of the billiard ball is calculated only by calculation, but the actual rotation is not performed. It is not possible to determine how much spinning force is generated by hitting, and due to inaccurate information on the spinning force, it is difficult to accurately calculate the refraction angle after the collision due to the rotational speed of the billiard ball and thus the simulation results appear somewhat inaccurate.

As described above, Prior Art Documents 1 and 2 provide an effect of enabling billiard practice even in a narrow place by hitting a billiard ball, receiving hitting information therefrom, providing the hitting information to a driving state information processing software, and providing the result through arithmetic processing.

However, with Prior Documents 1 and 2, it is difficult to accurately provide the movement direction of a billiard ball because there is no measuring means for the spinning direction and spinning speed of the billiard ball. That is, in actual billiards, since the spinning direction of a billiard ball is formed differently depending on the position of a hitting point, and the spinning speed affects the angle of refraction with respect to a target ball, hitting information on the spinning direction and spinning speed of the billiard ball is also required. However, Prior Art Documents 1 and 2, there is no separate means for measuring the spinning of a billiard ball, so it is difficult to provide an accurate calculated value depending on the movement of the billiard ball in consideration of the spinning of the billiard ball.

Therefore, a need for a new type of a drive state information input and control device for hitting or the like of a billiard ball has been raised which can improve the accuracy for a resultant driving state of a billiard ball by measuring various hitting information while enjoying a realistic billiard game even in a narrow place.

DISCLOSURE OF INVENTION

Technical Problem

Accordingly, the present disclosure provides a billiard ball driving state information input and control device, in which an actual billiard ball is directly hit with the actual billiard cue stick, various driving state information is input therefrom, and the driving state information is provided to driving state information processing software to derive results, wherein results similar to those of an actual billiard game are derived by measuring various variables, thereby providing a sense of reality to enjoy a billiard game in cyberspace as if the game were actually being played.

In particular, the present disclosure provides a billiard ball drive state information input and control device, in which variables for the spinning direction and speed of a billiard ball can be measured, so the measured values are applied to driving state information processing software that allows a billiard game to be played in cyberspace so that results similar to those obtained in an actual billiard hall can be represented in terms of the direction and amount of movement of the billiard ball.

Solution to Problem

A billiard ball driving state information input and control device of the present disclosure for solving the above-described problems is a billiard ball driving state information input and control device that measures and provides driving state information of a billiard ball in a cyber billiard game system in which driving state information generated by hitting a billiard ball is received, the received information is analyzed and processed by driving state information processing software, and the processed information is provided as an image through a screen display device. The billiard ball driving state information input and control device includes: a hitting input device configured to surround and support a billiard ball as a target to be hit to be freely spinnable and measure hitting information when the billiard ball is hit; a table fixing device configured to fix the hitting input device to a table such that the hitting input device can be rotated and bent rearward; and a control unit configured to: analyze and process driving state information, which is various measurement values measured by the hitting input device; provide the analyzed and processed driving state information as an image, wherein a manipulator configured to perform manipulation to switch a position to see a billiard table and a billiard ball in the provided image is connected to the control unit; and execute various signal controls of the cyber billiard game system.

The hitting input device includes: a billiard ball to be hit with a cue stick; a pocket surrounding the billiard ball to be freely spinnable; a plurality of impact sensors mounted inside the pocket; and a rotation bar extending to the lower portion of the pocket.

The pocket may surround the billiard ball in the range of 180 to 200 degrees to prevent it from being removed to a front side, wherein the pocket may include a plurality of spinning support protrusions formed using ball bearings or hemispherical protrusions so as to support the billiard ball to be freely spinnable.

In addition, a billiard table cloth may be further laminated on an entire inner surface of the pocket or the impact sensors or the spinning support protrusions.

In addition, in the front surface of the pocket in which the billiard ball is exposed, a billiard ball display region, which surrounds and covers the billiard ball, may be painted or an auxiliary member made of the material of the billiard ball may be attached to the billiard ball display region so that the actual size of the billiard ball can be confirmed.

In addition, the pocket may be further equipped with a rotation measurement sensor to receive information on a spinning direction and speed of the billiard ball among hitting information.

In addition, the table fixing device may include: a horizontal rotation rod integrally coupled to a lower end of the rotation bar of the hitting input device; a hanger including a vertical bar portion rotatably hinged to each of opposite sides of the horizontal rotation rod, a hook formed at the upper end of the vertical bar portion to be engaged with a top surface of the table, and a vertical tightening hole formed in a surface extending toward the table from the lower end of the vertical bar portion; and a tightening rod coupled to the vertical tightening hole in the hanger and configured to press the bottom surface of the table by being raised and lowered.

The table fixing device may be further provided with a return device configured to rotate the horizontal rotation rod in order to return the hitting input device bent rearward by hitting to an original position thereof.

The return device may be any one of a motor gear-coupled to the horizontal rotation rod, a winding spring, a tension spring, and a weight.

In addition, the table fixing device may further include, at an end of the horizontal rotation rod, a tilt sensor configured to measure a rotation angle to receive information on a maximum tilt angle of the hitting input device after hitting the billiard ball.

In addition, a terminal holder may be further provided on the hanger, wherein the terminal holder may include a "U"-shaped spacing adjustment stand extending upward from the hook and opened to a lower side and a terminal mounting unit installed in an upper center of the spacing adjustment stand.

In addition, the table in front of the billiard ball may further include a sensor pad including a plurality of motion sensors arranged in a plurality of rows thereon to detect a moving direction of an actual billiard cue stick when hitting the billiard ball.

In addition, the manipulator of the control unit may include a joystick or a terminal communication-connected to the control unit.

Advantageous Effects of Invention

With the billiard ball driving state information input and control device for a cyber billiard game system of the present disclosure according to the above-mentioned solution means, It is possible to provide the same hitting feeling as in a billiard hall using an actual billiard ball as a target to hit with an actual billiard cue stick and to install and use the device even in a narrow space since the hit billiard ball is limited in movement by rotation.

In particular, since the billiard ball is mounted to rotate while spinning freely, it is possible to measure information on the spinning direction and spinning speed of the billiard ball, and using the measured values, and to accurately analyze the angle at which the actually hit billiard ball collides with another target ball and then refracts through the billiard ball driving state information analysis software. Therefore, it is possible to provide a device that enables billiards skills to be improved regardless of environment and time, for example, by providing the same effect that can be experienced in an actual billiard hall.

BEST MODE FOR CARRYING OUT THE INVENTION

Figure 1A:
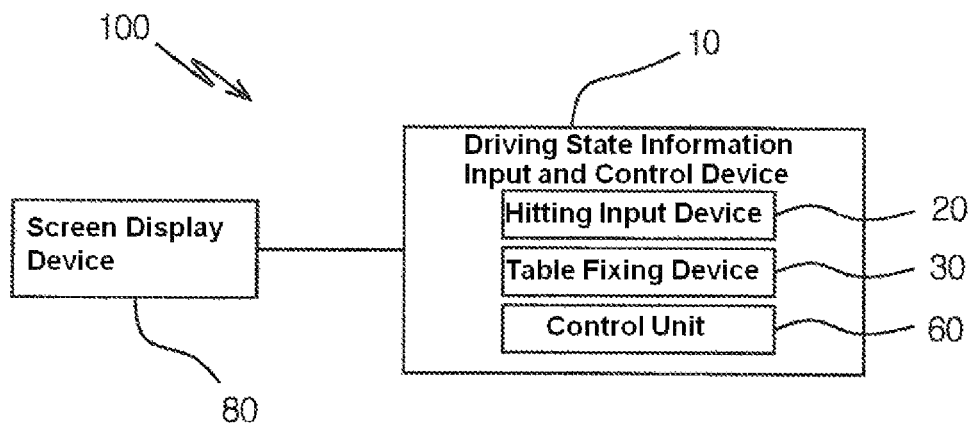
FIG. 1A is a block diagram of a cyber billiard game system to which a billiard ball driving state information input and control device according to the present disclosure is applied.

Hereinafter, embodiments of the present disclosure will be described with reference to the accompanying drawings. The present disclosure may be variously modified and may have various embodiments. Thus, specific embodiments will be exemplified in the drawings, and will be described in detail in the detailed description. However, it should be understood that this is not intended to limit the present disclosure to specific embodiments, and all the modifications, equivalents, and substitutions fall within the spirit and scope of the present disclosure. Like reference numerals have been used for like elements in illustrating respective drawings. In the accompanying drawings, the dimensions of structures are enlarged or reduced compared to actual sizes for clarity of the present disclosure.

The terms used herein are only used to describe specific embodiments, and are not intended to limit the present disclosure. An expression in a singular form includes an expression in a plural form as well, unless the context clearly indicates otherwise. The terms "comprises," "comprising," "includes," "including," "containing," "has," "having" or other variations thereof are inclusive and therefore specify the presence of stated features, integers, steps, operations, components, and/or combinations thereof, but do not preclude the possibility of presence or addition of one or more other features, integers, steps, operations, elements, components, and/or combinations thereof.

Unless otherwise defined, all terms used herein, including technical or scientific terms, have the same meaning as commonly understood by a person ordinarily skilled in the art to which the present disclosure belongs. Terms, such as those defined in a commonly used dictionary, should be interpreted as having a meaning consistent with the meaning in the context of the related art, and should not be interpreted in an ideal or excessively formal meaning unless explicitly defined herein.

Figure 1B:
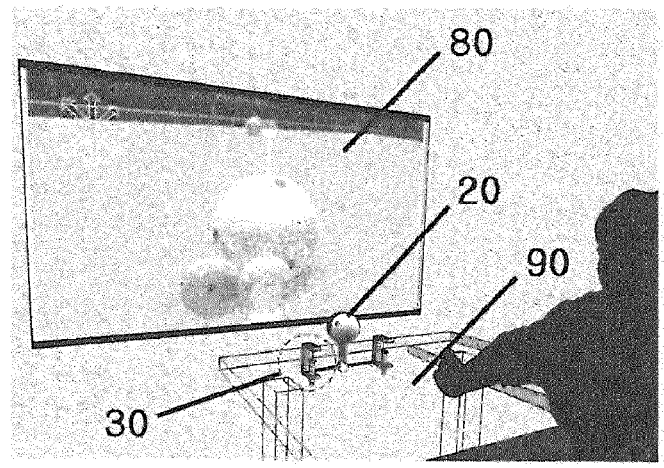
FIGS. 1B and 1C are respectively a perspective view and a side view illustrating a cyber billiard game system to which the billiard ball driving state information input and control device according to the present disclosure is applied.
Figure 1C:
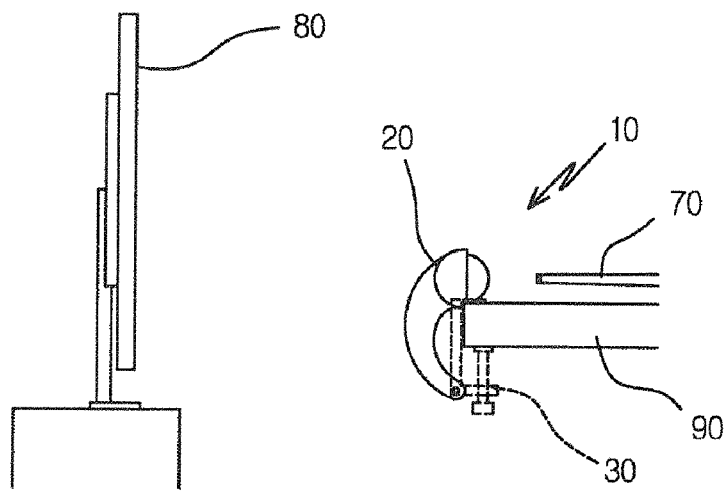

FIG. 1A is a block diagram of a cyber billiard game system to which a billiard ball driving state information input and control device according to the present disclosure is applied, and FIGS. 1B and 1C are respectively a perspective view and a side view illustrating a cyber billiard game system to which the billiard ball driving state information input and control device according to the present disclosure is applied.

As illustrated, a driving state information input and control device 10 of the present disclosure includes a hitting input device 20 that receives hitting information by being hit with a billiard cue stick, a table fixing device 30 configured to fix the hitting input device to a table 90, and a control unit 60 configured to analyze various signal controls. In addition, a screen display device 80 configured to display image information processed by the control unit may be further provided to configure a billiard game system 100.

In the billiard game system 100 configured as described above, the billiard ball driving state information input and control device 10 of the present disclosure is mounted on a table (a desk, a dining table, a table, or the like) in a place in which a billiard cue stick 70 is movable back and forth, whereby various information is measured at the time of hitting a billiard ball with a cue stick, the measured information is input into driving state information processing software for analysis and processing, and the processed result is displayed on the screen display device 80 so that an effect similar to actual billiards can be derived as much as possible. The screen display device 80 is any of a variety of display devices capable of displaying an image (a TV, a screen, a computer monitor, a smartphone, a laptop computer, or the like).

First, the hitting input device 20 of the billiard ball driving state information input and control device 10 of the present disclosure will be described in more detail with reference to FIG. 2A. The hitting input device 20 includes at billiard ball to be directly hit by cue stick 70 and a pocket 22 configured to surround the billiard ball to be freely spinnable.

The billiard ball 21 is the same as the billiard ball used in an actual billiard hall so that a user can experience the same hitting feeling as in the actual billiard hall. In addition, the billiard ball may be used in various sizes such as sizes for 3-ball (3-cushion) billiards, a 4-ball (balkline) billiards, and pocket ball size, etc., wherein the billiard ball may be used as a replaceable type or may be provided in a type in which the billiard ball and the pocket surrounding the billiard ball are replaced together.

The pocket 22 has a structure that surrounds the billiard ball 21 to be freely spinnable. Here, the pocket 22 is configured to surround the billiard ball 21 by 180 degrees or more to prevent the billiard ball from being removed forward, and preferably to cover the billiard ball in the range of 180 degrees to 200 degrees such that the hitting point of the billiard ball is not hidden when the billiard ball is hit with the cue stick 70 while the billiard ball is prevented from being removed from the inside of the pocket.

Figure 2A:
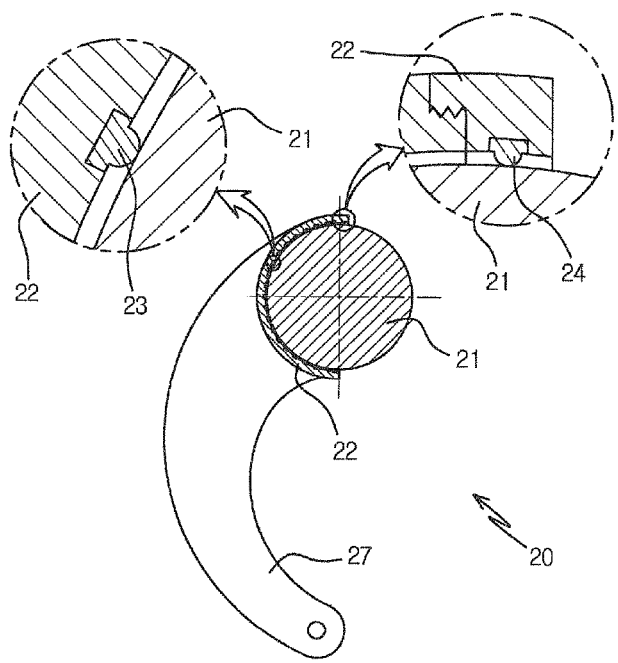
FIGS. 2A to 2E are respectively a configuration view and partial cross-sectional views illustrating a driving state information input and control device by hitting of a billiard ball according to various embodiments of the present disclosure.

In addition, as illustrated in the enlarged view of FIG. 2A, the pocket 22 may be configured in variously separated forms for product assembly. For example, the pocket 22 may be configured such that front and rear portions with reference to a vertical plane passing through the internal center are detachable from each other so that the billiard ball 21 can be easily introduced into the inside of the billiard ball 21.

In addition, the freely spinnable structure can minimize the contact area between the billiard ball 21 introduced into the pocket 22 and the inner surface of the pocket 22 so that the billiard ball is freely spinnable inside the pocket when the billiard ball is hit. Preferably, the contact method between the pocket 22 and the billiard ball 21 is implemented by point contact, wherein the point contact is implemented at three or more points arranged at equiangular intervals on the inner surface of the entrance and one point on the rear side so that the billiard ball can be supported in various directions while minimizing friction and free rotation of the billiard ball can be enabled. Here, the three contact points on the inlet side are configured to come into contact with the hemispherical surface of the billiard ball in the opening direction of the pocket after passing through the center of the billiard ball so that the billiard ball can be supported at the front and rear sides.

In the present disclosure, an impact sensor 23 and a spinning support protrusion 24 may be used as means for supporting the billiard ball 21 by point contact.

Figure 2B:
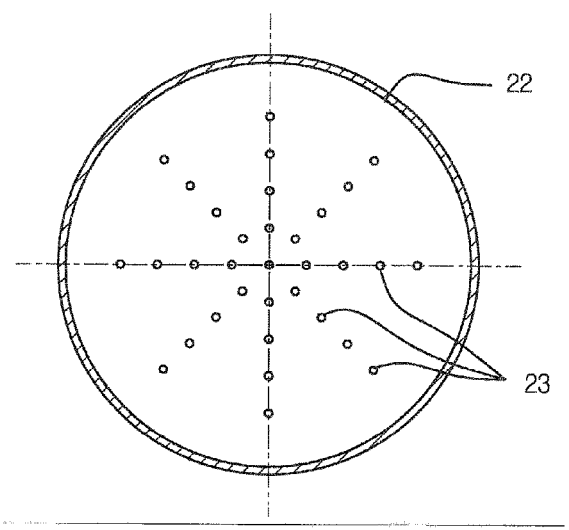

The impact sensor 23 is a sensor that has a hemispherical protruding surface as illustrates in FIG. 2A to implement point contact with the billiard ball 21. A plurality of impact sensors 23 may be arranged in the form of a checkerboard on the inner surface of the pocket 22 adjacent to the rear surface of the billiard ball, or, as illustrated in FIG. 2B, on the inner surface of the pocket 22, respective impact sensors 23 may be installed on the same horizontal line as the positions of hitting points of billiard ball so that, when a hitting point is hit, a corresponding impact sensor can detect an impact most quickly. Here, as the impact sensors, a sensor for simply determining whether or not an impact is detected or a sensor for detecting even the strength of an impact may be selectively used.

The spinning support protrusion 24 may be configured with a hemispherical protrusion or a ball bearing, and may be provided in an area, in which it is not necessary to detect an impact, so as to implement support by one-point contact with the billiard ball. As the material of the hemispherical protrusion, it is preferable to use a material having a low-frictional hard surface to maintain the shape thereof by including a metal material or a plastic material.

Figure 2C:
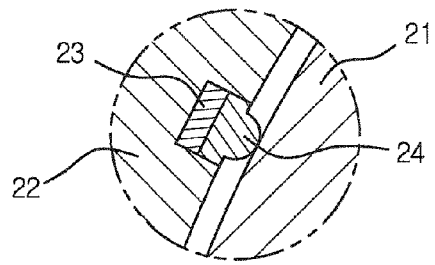

In addition, as illustrated in FIG. 2C, a groove may be deeply formed in the inner surface of the pocket 22, and the spinning support protrusion 24 formed by one of a hemispherical protrusion and a ball bearing may be arranged on the outside to be in contact with the billiard ball so as to minimize frictional force by one-point contact. In addition, an impact sensor 23 may be provided in a structure of being disposed inside the groove, which is inside the spinning support protrusion so that the impact sensor can receive an impact through in direct contact with the billiard ball.

In addition, spinning support protrusions 24 and impact sensors 23 may be mixed and arranged on the inner surface of the pocket. For example, an impact sensors 23 may be installed and supported in an area in which it is necessary to measure an impact, and a spinning support protrusion 24 may be installed in an area in which it is not necessary to measure an impact, thereby reducing a manufacturing cost.

Figure 2D:
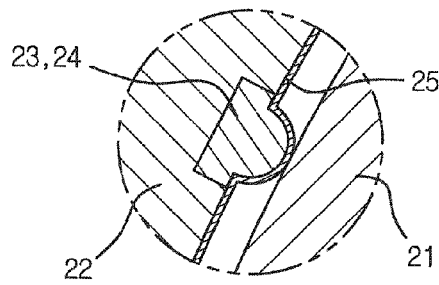

In addition, as illustrated in FIG. 2D, on the inner surface of the pocket 22, a billiard table cloth 25 may be attached to the entire inner surface or on the portions of the impact sensor or spinning support protrusions to provide friction similar to that of an actual billiard hall.

Figure 2E:
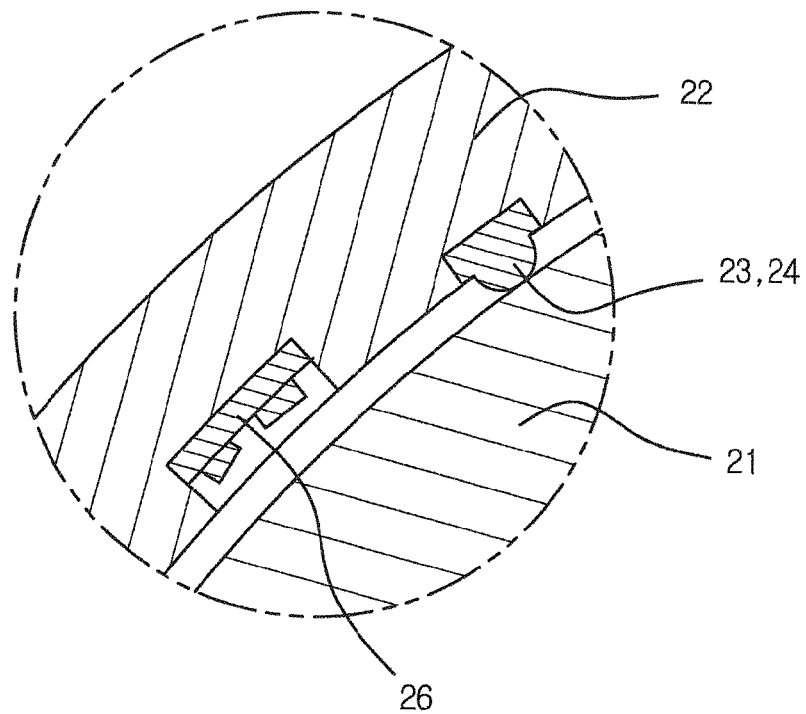

In addition, as illustrated in FIG. 2E, the pocket 22 can be further equipped with a rotation measurement sensor 26 to receive information on the spinning direction and speed of the billiard ball 21 among hitting information.

A representative example of the rotation measurement sensor 26 is an optical sensor. As an installation example, a groove is formed in the inner surface of the pocket 22 and the rotation measurement sensor 26 is mounted in the groove, as illustrated. The mounted rotation measurement sensor 26 includes a light-emitting unit and a sensor unit, the light emitting unit emits light to the billiard ball surface, and the sensor unit continuously photographs the surface of the billiard ball to which the light is emitted from the light-emitting unit. Here, it is possible to receive information on the spinning direction and spinning speed of the billiard ball using the rotation measurement sensor, for example, in the following manner: the emitted light may provide a unique dot image by varying the reflection angle depending on the curvature of the surface of the billiard ball, the movement direction may be extracted by analyzing the coordinates of the dots, and the spinning speed of the billiard ball may be extracted depending on the movement amount.

In addition, the rotation measurement sensor 26 may be installed on each of at least two or three axes to measure the speed for the three axes, and to verify the spinning direction through a comprehensive analysis of the measured speed.

As illustrated in FIG. 2A, the rotation bar 27 may extend to the lower portion of the pocket 22. The lower end of the rotation bar 27 may be integrally coupled to the horizontal rotation rod 31 of the table fixing device 30 so that, when the billiard ball is hit with a cue stick, the hitting input device 20 rotates with the horizontal rotation rod 31. Since the rotation of the hitting input device 20 prevents the billiard ball 21 from being removed from the table 90 after hitting, hitting practice can be performed repeatedly.

The rotation bar 27 may be formed as a vertical bar to be in contact with the side surface of the table, or may be formed as a curved bar having an outwardly curved portion and provided in the form that causes only the billiard ball to protrude on the table while corresponding to various shapes of side surfaces of the table.

Figure 3A:
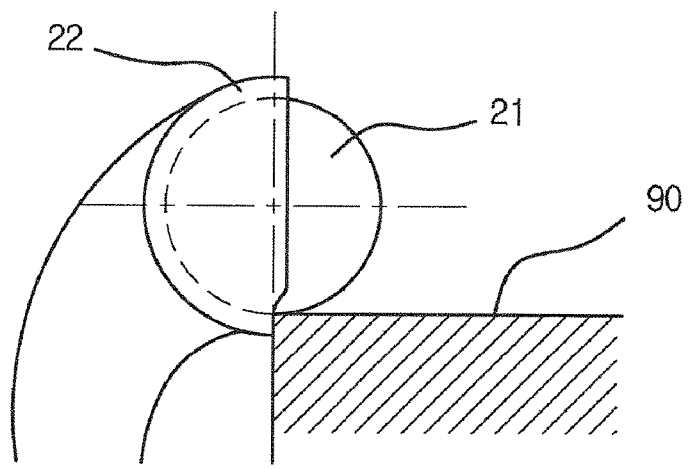
FIG. 3A is a side view illustrating a form in which the lower portion of a pocket according to an embodiment of the present disclosure is opened.

That is, as illustrated in FIG. 3A, the lower end of the pocket 22 may be partially removed so that the lower end of the billiard ball 21 can be exposed to the outside and the exposed bottom surface of the billiard ball 21 can be seated on the top surface of the table 90. Thus, the size of the billiard ball can be determined from the floor, so that the position of a hitting point can be determined in the same manner as an actual billiard ball.

Figure 3B:
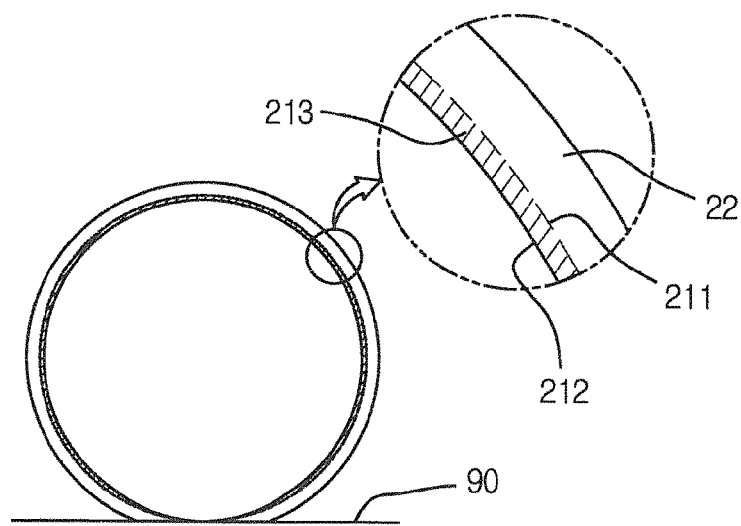
FIG. 3B is a front view of the pocket in which a billiard ball is installed according to an embodiment of the present disclosure.

In addition, as illustrated in FIG. 3B, since a portion of the pocket 22 surrounds the billiard ball 21, the actual outer line 211 of the billiard ball is hidden inside the pocket, and the billiard ball is exposed in a size smaller than that of the actual outer line of the billiard ball. Since the outer line 212 of the billiard ball exposed in this way may be mistaken as corresponding to the size of the billiard ball, it is difficult to determine the correct size of the billiard ball. Accordingly, the pocket 22 surrounding the billiard ball may be painted on a billiard ball display region 213, which is the front portion overlapping the actual size of the billiard ball, so that the billiard ball display region 213 can be seen as having the same size as the billiard ball. In addition, in the billiard ball display region 213, an auxiliary member, such as a circular band of the same material as the billiard ball, may be attached to the front portion of the pocket without a painting process, whereby the portion hidden in the pocket when the user sees the portion can be recognized as a billiard ball by the circular band or the painted portion so that the full size of the billiard ball can be recognized by the circular band or the painted portion to set the position of a hitting point.

Figure 4A:
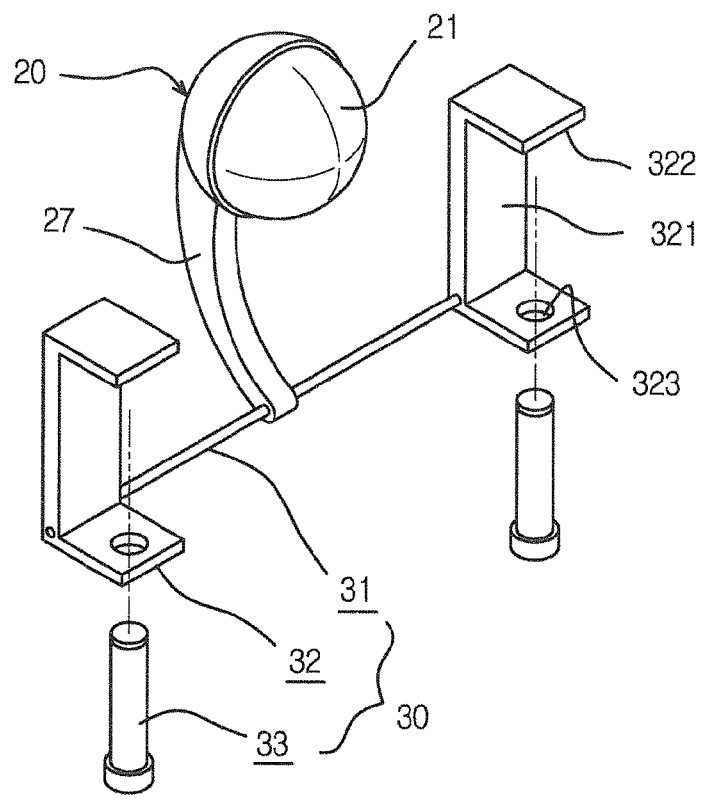
FIGS. 4A to 4C are respectively a perspective view, a front view, and an operational state view illustrating a driving state information input and control device for hitting a billiard ball according to the present disclosure.

Meanwhile, as illustrated in FIG. 4A, the table fixing device 30 is a device that is firmly fixed to the table 90 while being coupled to the hitting input device 20 to be rotated or bent rearward.

The table fixing device 30 includes a horizontal rotation rod 31 integrally coupled to the lower end of the rotation bar of the hitting input device, hangers 32 installed on opposite sides of the horizontal rotation rod, and tightening bars 33 for pressing the bottom surface of the table via the hangers 32.

The horizontal rotation rod 31 is coupled to the lower end of the rotation bar 27 of the hitting input device at the center thereof and is rotatably coupled to the hangers 32 at the opposite ends thereof.

Each hanger 32 includes a vertical bar portion 321 that is rotatably hinged to one end of the horizontal rotation rod 31, a hook portion 322 bent at the upper end of the vertical bar portion in a "¬" shape to be seated on and engaged with the top surface of the table 90, and a vertical tightening hole 323 is formed in the surface of a portion extending from the lower end of the vertical bar portion toward the table located at the front side. The vertical tightening hole 323 may have a screw thread formed on the inner surface thereof, and thus various techniques, in which the vertical tightening hole 323 is screwed with the tightening bar 33 to be described later or is tightened or loosened through upward and downward movements, may be applied thereto. Preferably, the hangers 32 are installed at the opposite ends of the horizontal rotating rod, respectively, and coupled to the table 90 such that a sufficient distance is provided between the two hangers so that a hand for a cue rest is not interfered with by the hangers when hitting the billiard ball.

Each of the tightening rod 33 is a bolt corresponding to one of the vertical tightening holes 323 and firmly couples the table fixing device by tightening the lower portion of the table by being raised or lowered so that the table fixing device is not removed. By forming an elastic rubber layer on the end portion of the tightening hole that comes into contact with the bottom surface of the table, it is possible to minimize table damage due to tightening.

Figure 4B:
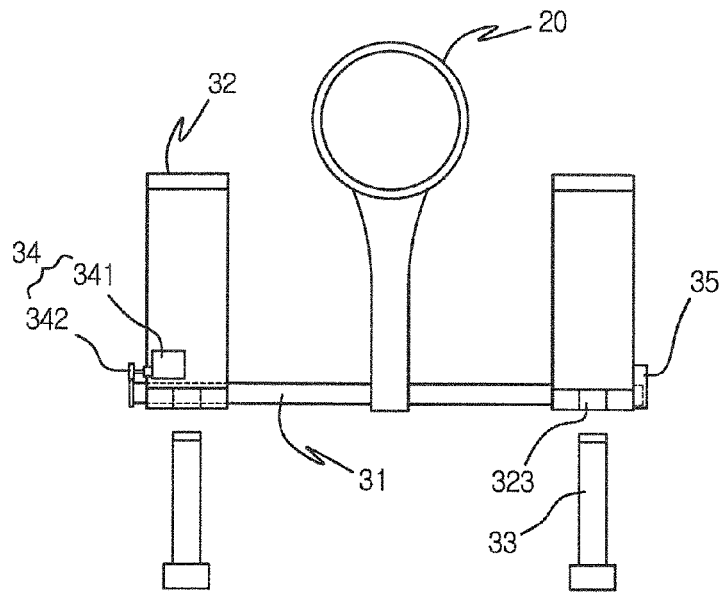
Figure 4C:
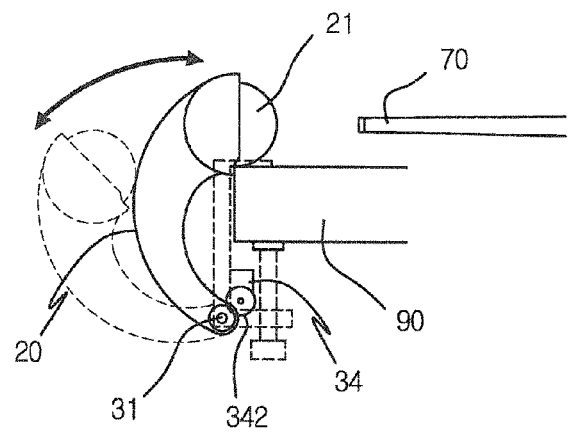

As illustrated in FIGS. 4B and 4C, the table fixing device 30 having the above-described structure may be further provided with a return device 34 configured to return the hitting input device 20, which is rotated and bent rearward due to the hitting by the cue stick 70, to the original position.

In the return device 34, a motor 341 is fixedly installed to one side of the hanger 32, and the motor 341 is engaged with the horizontal rotation rod 31 via a gear 342 so that the hitting input device 20 mounted on the horizontal rotation rod to be rotated by hitting can be returned to the original position by driving the motor 341, and the hitting input device 20 is preferably returned after being delayed for a few seconds, rather than being returned immediately after the hitting. Of course, the motor 341 may be equipped with a transmission to adjust the return speed of the hitting input device, and may generate a sound when the hitting input device is being returned to inform that the hitting input device is being returned. In addition, the return device 34 may achieve the returning by applying various methods using a winding spring, a tension spring, a weight, or the like.

In addition, the table fixing device 30 may be further provided with an angle sensor or a tilt sensor 35 at one end of the horizontal rotation rod 31 so that the maximum tilt angle of the hitting input device 20 can be measured after the billiard ball is hit. The rotation angle measured in this way may be converted into hitting strength by accumulated or standardized data. Here, the horizontal rotation rod 31 is coupled by a winding spring that provides constant resistance when coupled with the hanger to form a different rotation angle depending on hitting strength or to provide rotation resistance through the gear coupling of the transmission of the return device.

The hitting strength when hitting a billiard ball may be measured by a pressure load using the impact sensor 23 installed in the hitting input device 20, or may be calculated by measuring the rotation angle of the rotated hitting input device. When using the rotation angle, since rotation resistance means, such as a winding spring, is mounted on the hitting input device or the horizontal rotation rod, the horizontal rotation rod can be rotated by overcoming the elastic force of the winding spring only when applying at least a force greater than the elastic force of the winding spring at the time of hitting. Therefore, when the rotation angle according to a hitting force is converted into data, information on the hitting strength can be provided depending on the degree of inclination of the hitting input device. In addition, it is also possible to apply a method of providing hitting strength by measuring the speed of the cue stick at the time of hitting and converting the hitting strength.

Figure 5A:
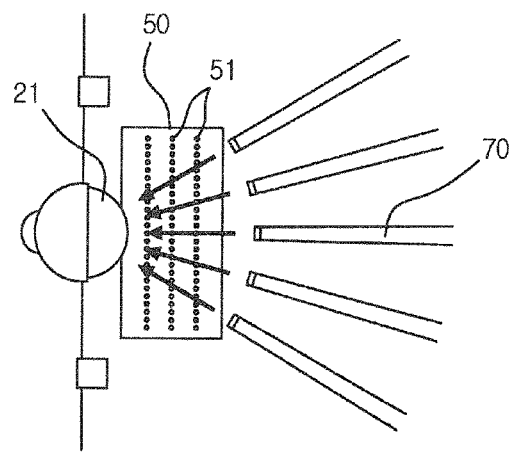
FIGS. 5A to 5C are configuration views illustrating respective operation states when a billiard cue stick direction sensor pad according to the present disclosure is mounted.
Figure 5B:
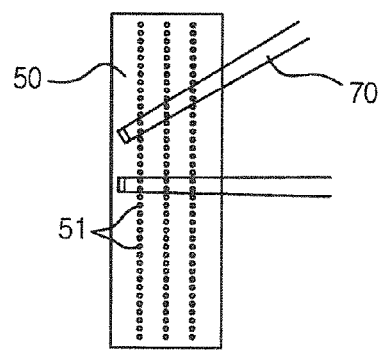

FIGS. 5A and 5B are plan views each illustrating a state in which a sensor pad is installed on the table.

As described above, the sensor pad 50 may be seated on the table 90 between the cue stick 70 and the billiard ball 21 in order to detect the direction in which the cue stick 70 approaches to hit the billiard ball 21 and to measure in which direction the billiard ball is hit.

In the sensor pad 50, a plurality of motion sensors 51 may be arranged in multiple rows so that the moving direction of the cue stick can be detected depending on the results detected in respective rows. Here, as the detection method by the motion sensors 51, various known techniques, such as a method of emitting light or electromagnetic waves from the motion sensors to detect the same and a method of mounting a corresponding sensor on a cue stick to detect the same, may be applied.

A sensing process will be described with reference to FIG. 5B. When the cue stick 70 linearly moves forward and rearward above the sensor pad 50, the motion sensors 51 of each row perform detection in the same straight line, and when the cue stick diagonally moves forward and rearward, the motion sensors of the lower row, the motion sensors of the intermediate row, and the motion sensors of the upper row have different detection positions, respectively. Thus, when the angles of the detection positions are determined, the direction of movement of the cue stick can be easily determined.

This makes it possible for the user to change the direction of hitting the billiard ball by a certain angle to adjust the hitting thickness in billiards in the same manner as in an actual billiard hall without any additional operation, rather than hitting the billiard ball of the hitting input device only linearly forward and rearward.

Figure 5C:
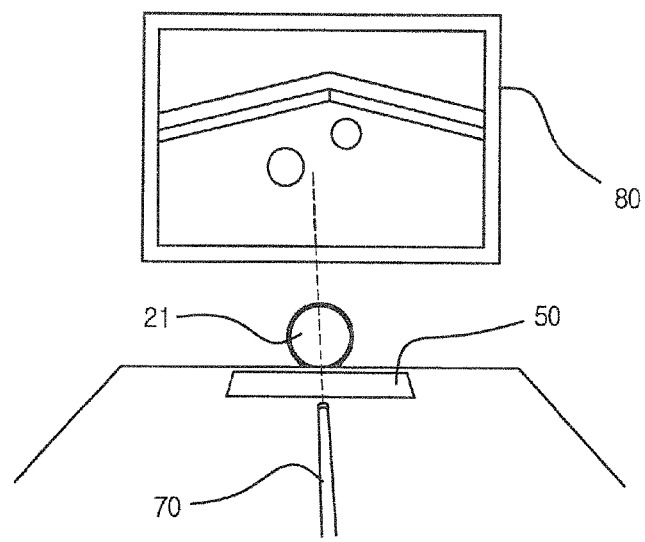

In addition, the sensor pad 50 may detect the hitting direction of the cue stick 70 as illustrated in FIG. 5C and may inform beginners of a hitting direction by displaying an extension line from a cue stick on the screen display device 80.

Figure 6:
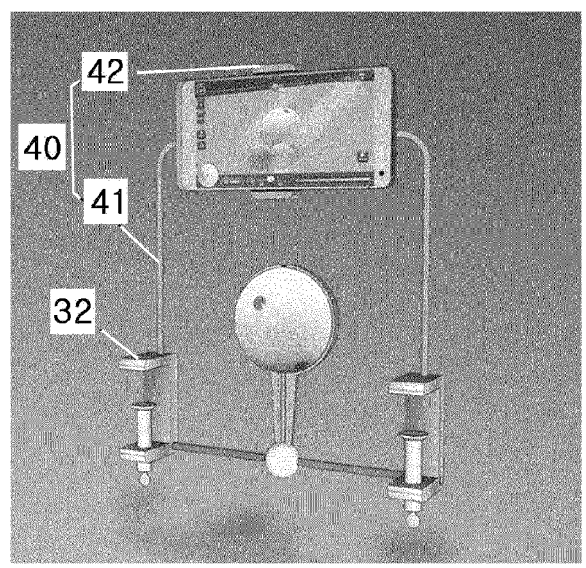
FIG. 6 is a perspective view illustrating a coupled state of a terminal holder capable of communication and cyber games according to another embodiment of the present disclosure.

As illustrated in FIG. 6, the billiard ball driving state information input and control device 10 according to the present disclosure may further include a terminal holder 40.

The terminal holder 40 includes a spacing adjustment stand 41 and a terminal mounting unit 42.

The spacing adjustment stand 41 is a "U"-shaped rod opened downward, wherein opposite ends of the spacing adjustment stand are detachably coupled to the hooks of the hangers 32, and the terminal mounting unit 42 is installed in the upper center of the spacing adjustment stand to fix a terminal.

Here, the spacing adjustment stand 41 may be formed using a bellows-type single tube and fixed to the table with tongs to be arranged in various directions, and, for example, various known mobile (e.g., a smartphone and a tablet PC) holder structures for a vehicle, in which terminal holding parts are configured to elastically move widthwise or longitudinally to fix terminals having various sizes, are applicable to the terminal mounting unit 42.

As described above, the measured values measured by the impact sensor 23, the rotation measurement sensor 26, the angle sensor, the inclination sensor 35, and the sensor pad 50 are transmitted to a control unit. The control unit may receive information about hitting points from the measurement values of the impact sensor, may receive hitting strength information from the measurement values of the tilt sensor or the angle sensor, may receive information about the spinning direction and speed of the billiard ball through the rotation measurement sensor, and may receive information about the hitting direction from the measurement values on the sensor pad.

The control unit applies the hitting information provided through wired/wireless communication to driving state information processing software and provides a resultant image obtained through an analysis process.

In particular, since the control unit precisely measures the spinning speed and direction of the billiard ball based on the spinning of the actual billiard ball, it is possible to minimize an error range at the time of calculating a refraction angle of the billiard ball after colliding with a target ball.

The control unit 60 may have a configuration including a central processing unit, database, RAM, ROM, etc., or may be a control program or application, and may provided as a separate body or in a built-in form coupled to one side of the hitting input device or the table fixing device or may be provided in a form utilizing other communication devices.

Figure 7A:
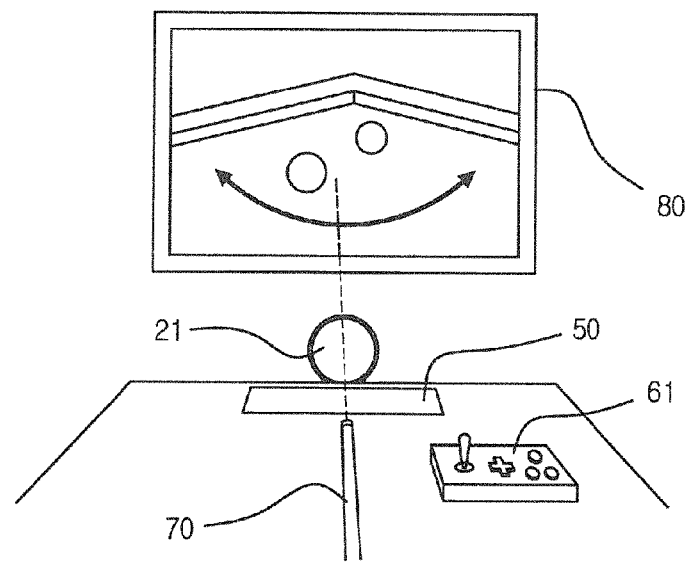
FIGS. 7A and 7B are perspective views showing an example of changing the screen of a screen display device by a control device according to another embodiment of the present disclosure.
Figure 7B:
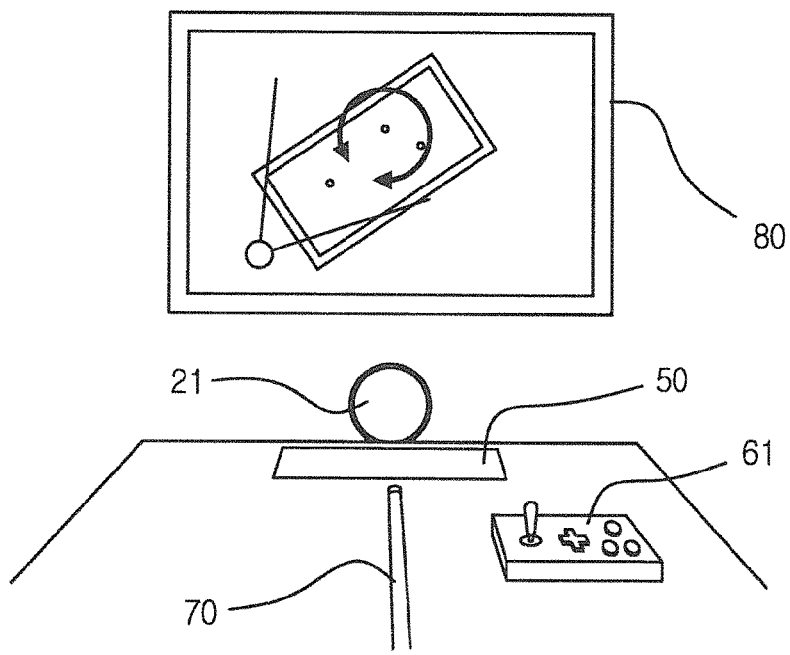

As illustrated in FIGS. 7A and 7B, the driving state information input control device 10 according to the present disclosure may further include a manipulator 61. The manipulator 61 may be connected to the control unit in a wired or wireless manner in order to set the spinning direction of the billiard table on the screen and to change the hitting position of the billiard ball. A representative example of the manipulator is a joystick. In addition, a mobile terminal capable of communication may be used as the manipulator to be connected to the control unit, or a mobile terminal may be used as a control unit and a manipulator.

The manipulator 61 enables one of the full screen of the billiard table which is to be displayed when the billiard table is viewed from above the same (FIG. 7A) and a screen which is to be displayed when the eye level is lowered in order to hit the billiard ball of the hitting input device as a cue ball (FIG. 7B) to be selected as a screen to be displayed on the screen display device 80. In addition, it is possible to provide images in various visual directions by rotating each screen or moving the viewpoint, and it is possible to enable various detailed settings including re-viewing, returning to the previous screen, and saving the current game environment.

As described above, in the billiard ball driving state information input and control device according to the present disclosure, a screen is selected by switching screens displayed on the screen display device using the manipulator, and the cue stick is arranged such that the billiard ball of the hitting input device collides with a target ball of the screen display device, and hitting is performed. The hit billiard ball rotates freely in the hitting input device, and the hitting input device rotates rearward.

In this process, when the cue stick passes the sensor pad, the hitting direction is detected, when the billiard ball is hit, hitting point information is measured by an impact sensor installed on the inner surface of the pocket in the hitting direction, and when the billiard ball is rotated by a hitting force, the spinning direction and spinning speed of the billiard ball are measured by the rotation measurement sensor. The tilt sensor measures the maximum rotation angle of the hitting input device and transmits the measured maximum rotation angle to the control unit. The control unit converts hitting strength into an angle measurement value, inputs respective pieces of information to the drive state information processing software to be analyzed and processed, and causes a derived result to be displayed on the screen display device as an image.

The invention claimed is:

1. A billiard ball driving state information input and control device that measures and provides driving state information of a billiard ball in a cyber billiard game system (100) in which hitting information is received by hitting a billiard ball, the received hitting information is analyzed and processed by driving state information processing software, and the processed information is provided as an image through a screen display device, the billiard ball driving state information input and control device comprising:

a hitting input device (20) including an actual billiard ball (21), which is hit with a cue stick as a hitting target, and a pocket configured to surround the billiard ball in the range of 180 to 200 degrees to prevent the billiard ball from being removed to a front side, wherein the pocket includes a plurality of spinning support protrusions (24) formed using ball bearings or hemispherical protrusions on an inner surface thereof so as to surround and support the billiard ball to be freely spinnable, the hitting input device (20) being configured to measure hitting information when the billiard ball is hit;

a table fixing device (30) configured to fix the hitting input device (20) to the table such that the hitting input device (20) can be rotated and bent rearward; and a control unit (60) configured to: analyze and process driving state information, which is various measurement values measured by the hitting input device; provide the analyzed and processed driving state information as an image, wherein a manipulator (61) configured to perform manipulation to switch a position to see a billiard table and a billiard ball in the provided image is connected to the control unit; and execute various signal controls of the cyber billiard game system.

2. The billiard ball driving state information input and control device of claim 1, wherein the hitting input device (20) includes:
- a plurality of impact sensors (23) mounted inside the pocket; and
- a rotation bar (27) extending to the lower portion of the pocket.

3. The billiard ball driving state information input and control device of claim 2, wherein a billiard table cloth (25) is further laminated on an entire inner surface of the pocket (22) or the impact sensors (23) or the spinning support protrusions (24).

4. The billiard ball driving state information input and control device of claim 1, wherein, in a front surface of the pocket (22) in which the billiard ball (21) is exposed, a billiard ball display region (213), which surrounds and covers the billiard ball, is painted or an auxiliary member is attached to the billiard ball display region so that an actual size of the billiard ball can be confirmed.

5. The billiard ball driving state information input and control device of claim 1, wherein the pocket (22) is further equipped with a rotation measurement sensor (26) to receive information on a spinning direction and speed of the billiard ball among hitting information.

6. The billiard ball driving state information input and control device of claim 1, wherein the table fixing device (30) includes:
- a horizontal rotation rod (31) integrally coupled to a lower end of the rotation bar of the hitting input device;
- a hanger (32) including a vertical bar portion (321) rotatably hinged to each of opposite sides of the horizontal rotation rod, a hook (322) formed at an upper end of the vertical bar portion to be engaged with a top surface of the table, and a vertical tightening hole (323) formed in a surface extending toward the table from a lower end of the vertical bar portion; and
- a tightening rod (33) coupled to the vertical tightening hole in the hanger and configured to press a bottom surface of the table by being raised and lowered.

7. The billiard ball driving state information input and control device of claim 6, wherein the table fixing device (30) is further provided with a return device (34) configured to rotate the horizontal rotation rod (31) in order to return the hitting input device (20) bent rearward by hitting to an original position thereof.

8. The billiard ball driving state information input and control device of claim 7, wherein the return device (34) is any one of a motor (341) gear-coupled to the horizontal rotation rod (31), a winding spring, a tension spring, and a weight.

9. The billiard ball driving state information input and control device of claim 6, wherein the table fixing device (30) further includes, at an end of the horizontal rotation rod, a tilt sensor (35) configured to measure a rotation angle to receive information on a maximum tilt angle of the hitting input device (20) after hitting the billiard ball.

10. The billiard ball driving state information input and control device of claim 6, further comprising:
- a terminal holder (40) on the hanger (32), wherein the terminal holder includes a "U"-shaped spacing adjustment stand (41) extending upward from the hook and opened to a lower side and a terminal mounting unit (42) installed in an upper center of the spacing adjustment stand.

11. The billiard ball driving state information input and control device of claim 1, wherein the table (90) in front of the billiard ball (21) is further provided with a sensor pad (50) including a plurality of motion sensors (51) arranged in a plurality of rows thereon to detect a moving direction of an actual billiard cue stick when hitting the billiard ball.

12. The billiard ball driving state information input and control device of claim 1, wherein the manipulator (61) of the control unit (60) includes a joystick or a terminal communication-connected to the control unit.

* * * * *